US012215826B2

(12) United States Patent
Ernull et al.

(10) Patent No.: US 12,215,826 B2
(45) **Date of Patent: *Feb. 4, 2025**

(54) SUPPORT STRUCTURE FOR SHORTENED CRYOGENIC TRANSPORT TRAILER

(71) Applicant: PLUG POWER INC., Latham, NY (US)

(72) Inventors: Bob Ernull, Latham, NY (US); Nidhi Shah, Latham, NY (US); Mark Ollweiler, Latham, NY (US)

(73) Assignee: PLUG POWER INC., Latham, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,388

(22) Filed: Feb. 23, 2023

(65) Prior Publication Data

US 2023/0204160 A1 Jun. 29, 2023

Related U.S. Application Data

(63) Continuation of application No. 16/998,886, filed on Aug. 20, 2020, now Pat. No. 11,608,939.

(60) Provisional application No. 62/891,020, filed on Aug. 23, 2019.

(51) Int. Cl.
*F17C 13/08* (2006.01)
*F17C 1/14* (2006.01)

(52) U.S. Cl.
CPC .............. *F17C 13/083* (2013.01); *F17C 1/14* (2013.01); *F17C 13/086* (2013.01); *F17C 2201/0109* (2013.01); *F17C 2203/0629* (2013.01); *F17C 2203/0646* (2013.01); *F17C 2205/0157* (2013.01); *F17C 2221/011* (2013.01); *F17C 2221/014* (2013.01); *F17C 2221/016* (2013.01); *F17C 2223/0161* (2013.01); *F17C 2270/0171* (2013.01)

(58) Field of Classification Search
CPC ........ F17C 13/086; F17C 13/083; F17C 1/14; F17C 2201/0109; F17C 2203/0629; F17C 2203/0646; F17C 2205/0157; F17C 2270/0171; F17C 2223/0161; F17C 2221/016; F17C 2221/014; F17C 2221/011
See application file for complete search history.

(56) References Cited

U.S. PATENT DOCUMENTS

| | | | | |
|---|---|---|---|---|
| 3,734,169 | A | 5/1973 | Falk | |
| 4,156,492 | A | 5/1979 | Cavanna et al. | |
| 4,394,929 | A | 7/1983 | Patel et al. | |
| 4,674,289 | A | 6/1987 | Andonian | |
| 4,674,674 | A | 6/1987 | Patterson et al. | |
| 11,608,939 | B2 * | 3/2023 | Ernull | F17C 13/086 |

(Continued)

*Primary Examiner* — Stephen J Castellano
(74) *Attorney, Agent, or Firm* — Heslin Rothenberg Farley & Mesiti P.C.

(57) ABSTRACT

A cryogenic dewar may include an inner tank and an outer tank. The cryogenic dewar may further include a plurality of trunnion mounts. A first four of the trunnion mounts may be coupled between a front half of the inner tank and a front half of the outer tank. A second four of the trunnion mounts may be coupled between a rear half of the inner tank and a rear half of the outer tank. The trunnion mount may be further strengthen with a plurality of pie-shaped reinforcing pads welded to each other and to an outer surface of the inner tank.

13 Claims, 7 Drawing Sheets

(56) References Cited

U.S. PATENT DOCUMENTS

| | | | |
|---|---|---|---|
| 2002/0104581 | A1 | 8/2002 | Drube et al. |
| 2015/0090727 | A1 | 4/2015 | Kataoka |
| 2015/0376859 | A1 | 12/2015 | Phuly |
| 2017/0007979 | A1 * | 1/2017 | Zhu ............................ B01J 3/03 |
| 2017/0254481 | A1 | 9/2017 | Cadogan et al. |
| 2018/0066796 | A1 | 3/2018 | Heon et al. |
| 2020/0331773 | A1 | 10/2020 | Parthasarathy |

* cited by examiner

SUPPORT STRUCTURE FOR SHORTENED CRYOGENIC TRANSPORT TRAILER

CROSS-REFERENCE TO RELATED PATENT APPLICATIONS

This is a continuation application of U.S. patent application Ser. No. 16/998,886 filed Aug. 20, 2020, now U.S. Pat. No. 11,608,939, which claims the benefit of priority of U.S. Provisional Patent Application No. 62/891,020 filed on Aug. 23, 2019 and entitled "Aluminum Micro Bulk Trailers (Mini Trailer)," which is hereby incorporated by reference herein.

FIELD OF THE DISCLOSURE

The instant disclosure relates to the transport of cryogenic materials. More specifically, portions of this disclosure relate to trailer designs for the transportation of cryogenic materials.

BACKGROUND

Cryogenic liquids may be stored and transported at low temperatures. For example, some cryogenic liquids may have boiling points below −130 degrees Fahrenheit and may be stored at low temperatures to maintain liquid form. One example of a cryogenic liquid, liquid Oxygen, may be transported at temperatures below −300 degrees Fahrenheit, the approximate boiling point of liquid Oxygen. As another example, liquid Argon likewise has a boiling point of approximately −300 degrees Fahrenheit and may be similarly maintained at low temperatures during transport. Other examples of cryogenic liquids may include liquid Nitrogen and liquid Helium. Environmental temperatures on Earth are far greater than the boiling points of cryogenic liquids, and thus transport structures must provide sufficient isolation between a storage unit for the cryogenic liquid and the environment during transport. Failure of the isolation structure may result in significant pressure build-up in the storage unit due to gasification of the cryogenic liquid, and possibly an explosion. Strong support structures for cryogenic transport structures may reduce the possibility of a dangerous explosion. However, the cryogenic transport structures must also meet guidelines that restrict the weight of trailers towing the cryogenic transport structure due to weight limits of road structures, such as bridges.

SUMMARY

A cryogenic transport structure, such as a dewar, mounted on a trailer and towed by a tractor, may be made of light-weight materials such as aluminum when accompanied by appropriate support structures that provide strength and resiliency to the cryogenic transport structure to sufficiently reduce the likelihood of dangerous explosions resulting from regasification of the cryogenic liquids during transport. For example, a weight of the trailer and transport structure may be reduced substantially by constructing all or part of the transport structure and/or trailer from aluminum when the tank is securely mounted to prevent failure of the transport structure. The weight limit of bridges and roads includes the weight of the structure and the weight of the cryogenic liquid. Thus, reducing the weight of the structure allows larger amounts of cryogenic liquid to be transported while remaining under the bridge weight limits. This reduces the cost of transporting the cryogenic liquid on a per-unit basis by allowing more cryogenic liquid to be carried in a tank.

An aluminum-based cryogenic dewar may include an outer tank and an inner tank. The inner tank may be coupled to and mounted within the outer tank using a plurality of trunnion mounts, allowing for a degree of resiliency in the mounting to dampen complex radial and axial forces generated by movement of the inner tank with respect to the outer tank. The use of a series of aligned trunnion mounts to couple the inner tank to the outer tank and/or internal longitudinal support stiffeners may enable more efficient dampening of movements of the outer tank, for example due to movement of a trailer on which the outer tank is located, and the inner tank and may strengthen a structural integrity of the inner tank. The secure and stable mounting provided by the trunnion mounts and the enhanced structural integrity of the inner tank provided by the internal longitudinal support stiffeners, may allow for lightweight materials, such as aluminum, to be used to form the structure of the dewar and the trailer while maintaining and/or improving a strength of the dewar.

In some embodiments, eight trunnion mounts may be used to couple the inner tank to the outer tank. A first four of the eight trunnion mounts may be coupled between a front half of the inner tank and a front half of the outer tank, and the other four of the eight trunnion mounts may be coupled between a rear half of the inner tank and a rear half of the outer tank. For example, a first trunnion mount of the first four trunnion mounts and a first trunnion mount of the second four trunnion mounts may be coupled between a top of the inner tank and a top of the outer tank. A second trunnion mount of the first four trunnion mounts and a second trunnion mount of the second four trunnion mounts may be coupled between a bottom of the inner tank and a bottom of the outer tank. A third trunnion mount of the first four trunnion mounts and a third trunnion mount of the second four trunnion mounts may be coupled between a road side of the inner tank and a road side of the outer tank. The road side of the inner tank and the outer tank may, for example, be a left-hand side of the inner and outer tanks when viewed from a cab pulling a trailer supporting the dewar. A fourth trunnion mount of the first four trunnion mounts and a fourth trunnion mount of the second four trunnion mounts may be coupled between a curb side of the inner tank and a curb side of the outer tank. The curb side of the inner tank and the outer tank may, for example, be a right-hand side of the inner and outer tanks when viewed from a cab pulling a trailer supporting the dewar. Thus, trunnion mounts may be positioned directly across from each other at the top and bottom of the dewar and on the right and left of the dewar, at the front and the back of the dewar, to provide support for the inner tank housing the cryogenic liquid. In some embodiments, more than or fewer than eight trunnion mounts may be used to support the inner tank within the outer tank of the cryogenic dewar.

The inner and outer tanks of the cryogenic dewar may be aluminum tanks. In some embodiments, a trailer upon which the dewar is mounted may also be formed from aluminum. The trunnion mounts may provide sufficient support for inner tank within the outer tank, allowing for safe transport of cryogenic liquids while reducing an empty weight of the dewar and/or the trailer due to the use of aluminum. Use of aluminum in the structure of the dewar and/or the trailer may also reduce the susceptibility of the trailer and/or dewar to corrosion, due to the corrosion-resistant properties of aluminum.

The trunnion mounts may comprise aluminum tubing. For example, the trunnion mounts may each comprise segments of eight inch outside diameter aluminum tubing, such as 5086 aluminum tubing, extending from an outer surface of the inner tank to an outer surface of the outer tank. The eight inch or larger diameter provide additional area and/or reinforcement to reduce likelihood of failure of the dewar. For example, the aluminum tubing of the trunnion mounts may extend to the outer tank, such as through windows or holes cut or otherwise formed in the outer tank. In some embodiments, the trunnion mounts may include one or more fiberglass supports between the inner tank and the outer tank to support the trunnion mounts. The fiberglass supports may insulate the inner tank from an external environment, inhibiting heat transfer from the inner tank to the outer tank and the external environment via the trunnion mounts.

In some embodiments, the trunnion mounts may include a plurality of pie-shaped reinforcing pads, such as four quarter-circle pads. Although quarter-circles are described for the pads, the pads may be other sizes of sectors of a circle or other shapes (e.g., rectangles or triangles). The reinforcing pads may be welded to each other and to an outer surface of the inner tank. For example, the pads may form a base for all or part of the trunnion mount on the external surface of the inner tank. The reinforcing pads may be curved to fit the form of the surface of the inner tank. Welding of four, or more, pie-shaped reinforcing pads in a circular arrangement may strengthen the support provided by the trunnion mounts. For example, use of four pie-shaped reinforcing pads in place of a single circular or rectangular reinforcing pad may provide additional welding surface area which may strengthen a connection between the trunnion mounts and the inner tank. In some embodiments, patch plates, such as circular patch plates may be attached to an outer surface of the outer tank adjacent the plurality of trunnion mounts. For example, a tube of the trunnion mount may extend to an opening in the outer surface of the outer tank. Patch plates may be fixed in place over such openings, such as by welding the patch plates to the outer surface of the outer tank.

In some embodiments, an insulation pad may be attached between the segment of the aluminum tubing and the inner surface of the outer tank and/or the patch plate. In some embodiments, one or more insulation pads may be coupled to an outer surface of the inner tank adjacent to the tube segment of each trunnion mount. Longitudinal support stiffeners may, in some embodiments, be coupled between a first portion of an inner surface of the inner tank adjacent a first trunnion mount and a second portion of an inner surface of the inner tank adjacent a second trunnion mount. Such longitudinal support stiffeners may further strengthen the structural integrity of the inner tank, rendering the dewar more resilient in the face of complex axial and radial forces that the inner tank, the outer tank, and the trunnion mounts may encounter during transportation of cryogenic fluids and thus less susceptible to structural failure.

In some embodiments, a length of a trailer upon which the dewar is mounted may be less than thirty-five feet. For example, an aluminum dewar and with trailer may transport a same or similar amount of cryogenic liquid as a steel dewar and with trailer in a shorter trailer frame while maintaining compliance with state and federal weight distribution guidelines, due to the high strength-to-weight ratio of aluminum. A trailer that is less than thirty-five feet in length, such as thirty-four feet or thirty-two feet in length, may provide enhanced maneuverability over a trailer that is forty to forty-two feet long. For example, shorter trailers may be easier to maneuver in urban settings, where a tighter turn radius may be desirable. Further, transportation of an aluminum dewar with trailer may be more cost effective due to the lower weight of aluminum. In some embodiments, the dewar with trailer may include a hydraulic cryogenic offloading system built into the dewar and/or trailer further enhancing efficiency in offloading transported cryogenic liquids over systems that must be connected to external offloading systems for offloading. For example, integrated offloading systems may offload cryogenic liquids at a greater rate than external systems.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
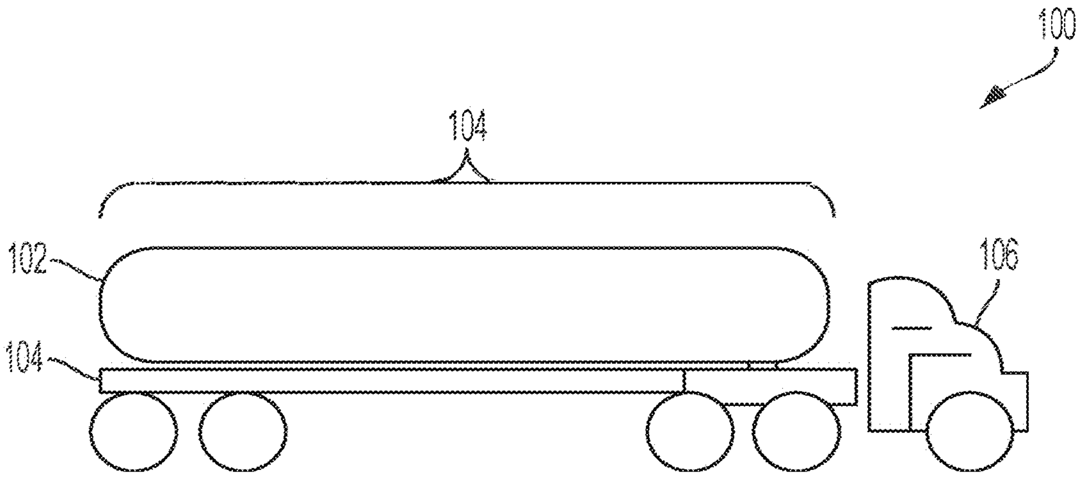
FIG. 1 is an example illustration of a truck hauling a trailer with a cryogenic dewar according to some embodiments of the disclosure.

Cryogenic dewars may be used to transport cryogenic liquids, such as Oxygen, Nitrogen, and Argon, at low temperatures. Cryogenic dewars may include a first, inner tank, mounted inside and supported by a second, outer, tank. The use of nested tanks may insulate the cryogenic liquid to help maintain low temperatures of the liquid during transport. An example illustration 100 of a cab 106 pulling a trailer 104 holding a cryogenic dewar 102 is shown in FIG. 1. Transportation of cryogenic liquids on federal highways is regulated by a variety of statutory provisions, such as the Surface Transportation Assistance Act of 1982 and the Federal Bridge Formula. Such provisions require that vehicles transporting cryogenic liquids on federal highways comply with certain weight and size guidelines. For example, many trailers for transporting cryogenic liquids may be 102 inches wide and at least 48 feet long, although some trailers may be between 28 feet and 48 feet. A maximum weight on trailer axels may be 20,000 pounds, while a maximum weight on tandem axels may be 34,000 pounds. A gross allowable weight for a trailer hauling a cryogenic dewar and the cargo may be 80,000 pounds. Trailers for transportation of cryogenic liquids may be between forty and forty-two feet long, or more, carrying the maximum weight of 80,000 pounds. However, such length may render trailers difficult to maneuver, particularly in urban areas where tight turn radiuses may be desirable. Furthermore, trailers made of heavy materials, such as steel, may have a high weight, even when not transporting cryogenic liquids. However, a dewar 102 and/or a trailer 104 made primarily or completely from aluminum may have a substantially lower empty weight. Aluminum trailers and dewars may also be resistant to corrosion. Furthermore, aluminum has a high strength-to-weight ratio and may maintain structural integrity of cryogenic dewars and or trailers while lowering an overall weight of the dewars and/or trailers. A lower trailer and/or dewar weight may allow a maximum amount of cryogenic liquid to be stored and transported on a shorter trailer, allowing for enhanced maneuverability of the trailer and reducing transportation costs. For example, a spacing between axels of the trailer, such as between first and fifth axels of the trailer and cab and/or between second and fifth axels of the trailer and cab, may be reduced while maintaining compliance with federal and state regulations. For example, a trailer length 104 may be reduced to less than thirty-five feet, such as thirty-four feet or thirty-two feet, hauling loads of 75,500 or 74,500 pounds, respectively.

Figure 2:
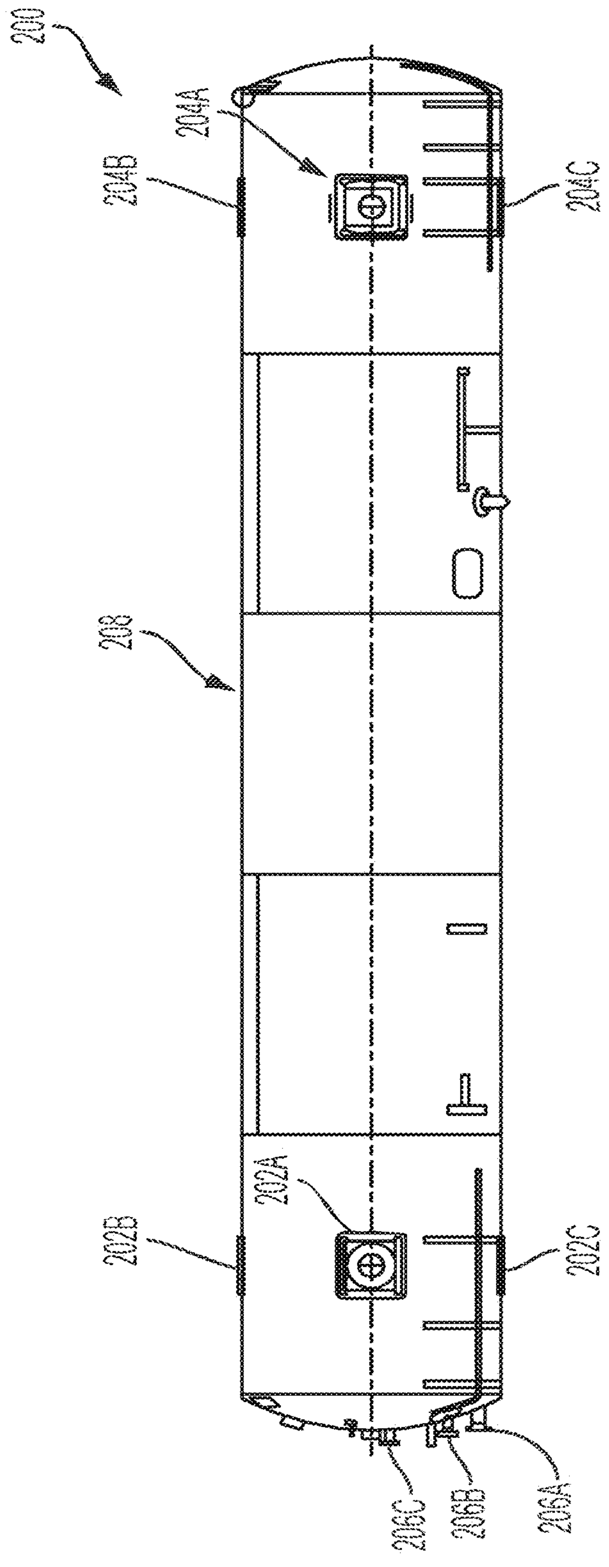
FIG. 2 is an example illustration of a cryogenic dewar according to some embodiments of the disclosure.

An example cryogenic dewar 200 is shown in FIG. 2. The cryogenic dewar 200 may include a plurality of trunnion mounts 202A-C and 204A-C for mounting an inner tank of the dewar (not shown) to the outer tank 208 of the dewar 200. For example, a first set of trunnion mounts 202A-C may be mounted between a rear of the inner tank of the dewar 200 and a rear of the outer tank 208 of the dewar 200. A first trunnion mount 202A may be mounted on a curb side of a rear portion of the dewar 200. A second trunnion mount (not shown) may be mounted on a road side of the rear portion of the dewar 200, opposite the first trunnion mount 202A. A third trunnion mount 202B may be mounted on a top of the rear portion of the dewar 200. A fourth trunnion mount 202C may be mounted on a bottom of the rear portion of the dewar 200 opposite the third trunnion mount 202B. Thus, each trunnion mount of the first, second, third, and fourth trunnion mounts 202A-C may be spaced across from one of the four trunnion mounts and approximately equidistant around a circumference of the dewar 200 from the other two of the four trunnion mounts. A second set of four trunnion mounts 204A-C may be mounted between a front of the inner tank of the dewar 200 and a front of the outer tank 208 of the dewar 200. A fifth trunnion mount 204A may be mounted on a curb side of a front portion of the dewar 200. A sixth trunnion mount (not shown) may be mounted on a road side of the front portion of the dewar 200, opposite the first trunnion mount 204A. A seventh trunnion mount 204B may be mounted on a top of the front portion of the dewar 200. An eighth trunnion mount 204C may be mounted on a bottom of the front portion of the dewar 200 opposite the third trunnion mount 204B. Thus, each trunnion mount of the fifth, sixth, seventh, and eighth trunnion mounts 204A-C may be spaced across from one of the four trunnion mounts and approximately equidistant around a circumference of the dewar 200 from the other two of the four trunnion mounts. The eight trunnion mounts 202A-C and 204A-C may provide enhanced stability to the inner tank of the dewar 200 and its contents. For example, the trunnion mounts 202A-C and 204A-C may provide enhanced stability for lightweight dewars constructed primarily or completely of aluminum handling complex forces that may be encountered by the dewar 200 during transportation of cryogenic liquids. In some embodiments, the only portion of trunnion mounts 202A-C and 204A-C visible from an exterior of the dewar 208 may be a plurality of patch plates welded or otherwise fixed in place over the internal trunnions. The location of the first and second sets of four trunnion mounts may vary along the length of the dewar 200, but in some embodiments the first four tunnion mounts may be located in a front quadrant of the dewar 200 and the second four trunnion mounts may be located in a back quadrant of the dewar 200.

Some dewars may require external offloading systems to offload cryogenic liquids once the dewar has reached its destination. A lightweight dewar, such as a dewar constructed primarily from aluminum may include an internal offloading system, or one located on the same trailer as the lightweight dewar, while transporting a similar volume of cryogenic liquids to an amount contained in a dewar made of steel and remaining within federal weight limits. Including an offloading system in the dewar 200 or on a trailer transporting the dewar 200 may enhance the efficiency and speed of offloading cryogenic liquids. A dewar 200 may include multiple valves 206A-C.

Figure 3:
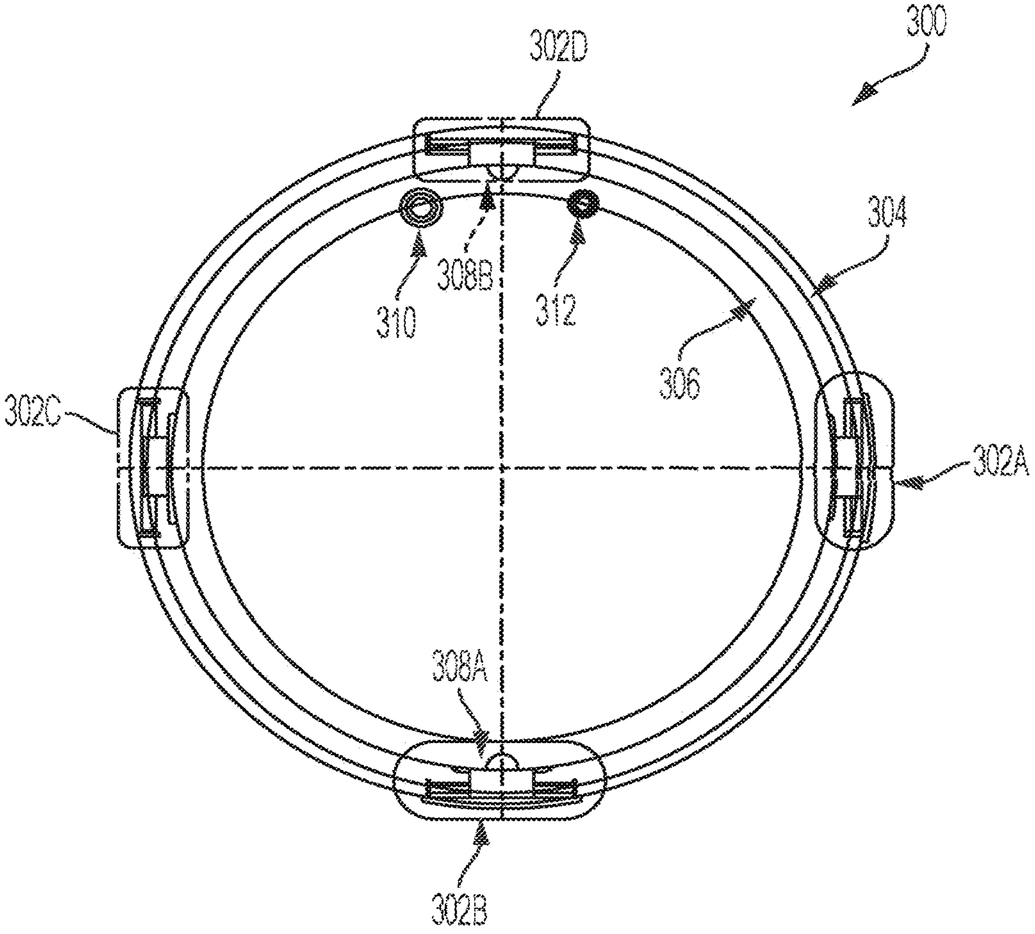
FIG. 3 is an example cross section of a portion of the cryogenic dewar having four trunnion mounts according to some embodiments of the disclosure.

An example cross section 300 of a cryogenic dewar showing positioning of trunnion mounts 302A-D is shown in FIG. 3. For example, trunnion mounts 302A-B, 302D may be analogous to trunnion mounts 202A-C or 204A-C, as shown in FIG. 2. As shown in FIG. 3, the four trunnion mounts 302A-D may be aligned about a circumference of the dewar 300. For example, the dewar 300 may include an outer tank 304 and an inner tank 306 housed within the outer tank. The inner tank 306 may be connected to and supported by the outer tank 304 by a plurality of trunnion mounts 302A-D. The plurality of trunnion mounts 302A-D may be coupled to an outer surface of the inner tank 306 and may extend through a portion or entirety of the outer tank 304. For example, the outer tank 304 may include windows or cutouts for the trunnion mounts 302A-D. In some embodiments, patch plates may be welded or otherwise attached to a surface of the outer tank 304 over openings in the outer tank 304 for each of the trunnion mounts 302A-D. In some embodiments, additional reinforcing metal work and/or welding, such as one or more internal longitudinal support stiffeners, may be attached to an interior surface of the inner tank 306 at each trunnion mount to further support the connection of the inner tank 306 to the outer tank 304 and a structural integrity of the inner tank 306 itself. As shown in FIG. 3, a first trunnion mount 302A may be connected between the inner tank 306 and the outer tank 304 on a curb side of the dewar 300 opposite a second trunnion mount 302C on a road side of the dewar 300. A third trunnion mount 302D may be connected between the inner tank 306 and the outer tank 304 on a top of the dewar 300 opposite a fourth trunnion mount 302B on a bottom of the dewar 300. Cutouts 308A-B, 310, 312 may be made for tubing, drain holes, and/or weep holes in the dewar 300.

Figure 4:
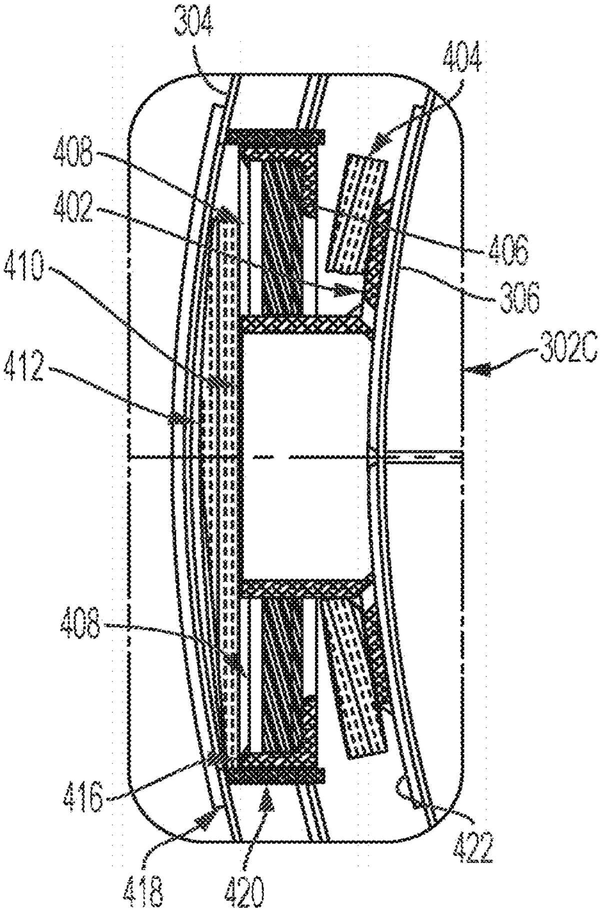
FIG. 4 is an example cross section of a trunnion mount for a cryogenic dewar according to some embodiments of the disclosure.

An example trunnion mount 302C is shown in greater detail in FIG. 4. The trunnion mount 302C may attach the inner tank 306 to the outer tank 304. The trunnion mount 302C may be welded to a surface of the inner tank 306. For example, a reinforcing pad 422, such as a circular reinforcing pad, may be welded to an outer surface of the inner tank 306, forming a base for all or part of the trunnion mount 302C. In some embodiments, the reinforcing pad 422 may include four quarter-circle pie-shaped plates that are each welded to each other, to form a circle, square, or other shape, and to the surface of the inner tank 306. Furthermore, the trunnion mount 302C may be welded to an interior of a cutout or window in outer tank 304. For example, a circular, or other shaped, cutout may be made in outer tank 304 and a frame of the trunnion mount, such as a support frame weldment including an outer support frame 420, may be welded to the circumference of the cutout in the outer tank 304.

The trunnion mount 302C may include a tubing segment 410, such as an aluminum tubing segment to form the core of the trunnion mount 302C. The tubing segment 410 may be a segment of eight inch outside diameter tubing. The tubing segment 410 may be welded to a surface of a reinforcing pad 422. In some embodiments, a support frame 408, which may include one or more support retainers for housing fiberglass supports, may be welded in place about the tubing segment 410. The support frame may, for example, include a fiberglass support segment 406. The fiberglass support segment 406 may provide enhanced insulation to cryogenic fluid in the inner tank 306, inhibiting flow of heat from the inner tank 306 to the outer tank 304 and an external environment via the trunnion mount 302C. A support doubler 402 may be attached to the reinforcing pad 422 and may provide enhanced support to the trunnion mount 302C.

Furthermore, additional support insulation 404, such as fiberglass support insulation, may provide enhanced insulation between the inner tank 306 and the outer tank 308. A support frame weldment 416 may connect the frame to 408 to an outer support frame 420 that is welded to a surface of a cutout in the outer tank 304. The support frame weldment 416 may include one or more stainless steel bars. A patch plate 418 may be welded or otherwise attached to an outer surface of the outer tank 304 over the cutout for the trunnion mount 302C. Additional insulation patches, such as a support insulation patch 412 may be included between the tubing segment 410 and the patch plate 412 of the trunnion mount 302C.

Figure 5A:
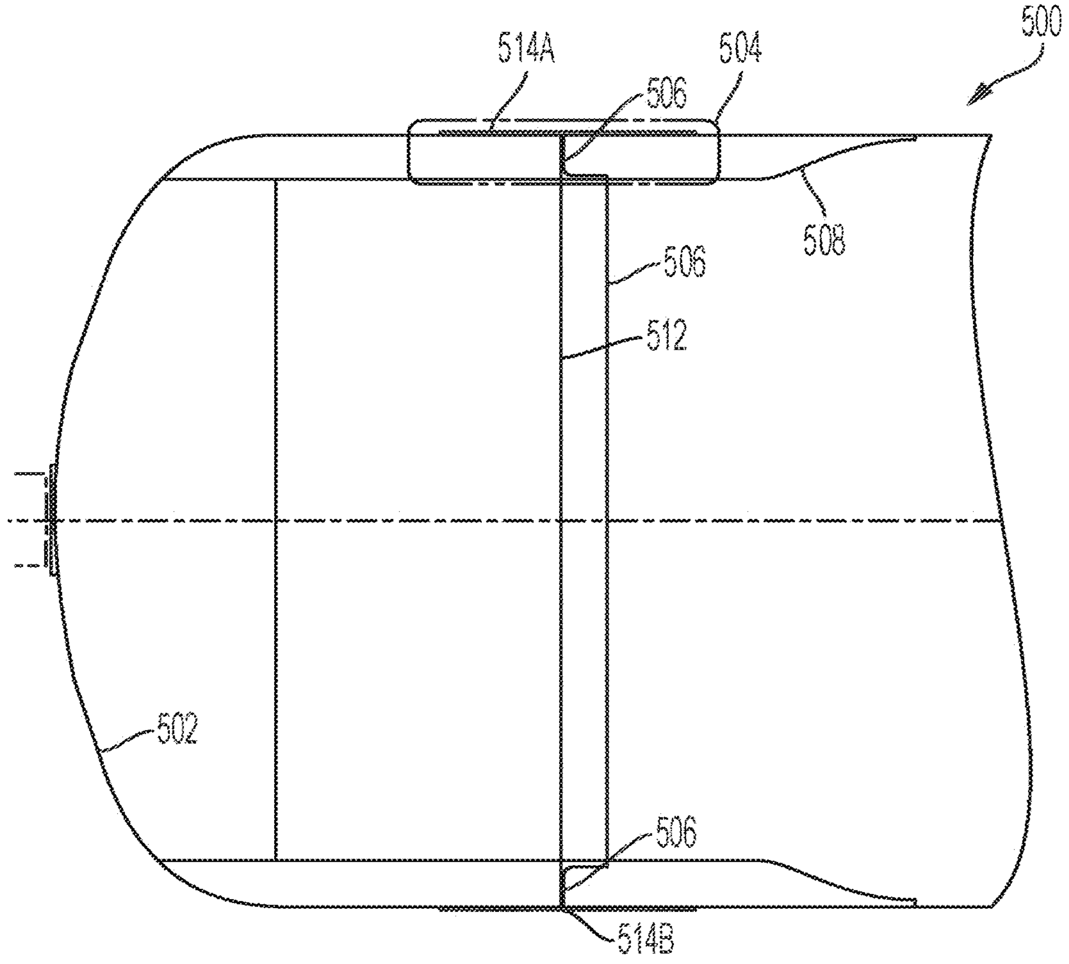
FIG. 5A is an example cross section of an inner tank of a cryogenic dewar having a longitudinal support stiffener according to some embodiments of the disclosure.
Figure 5B:
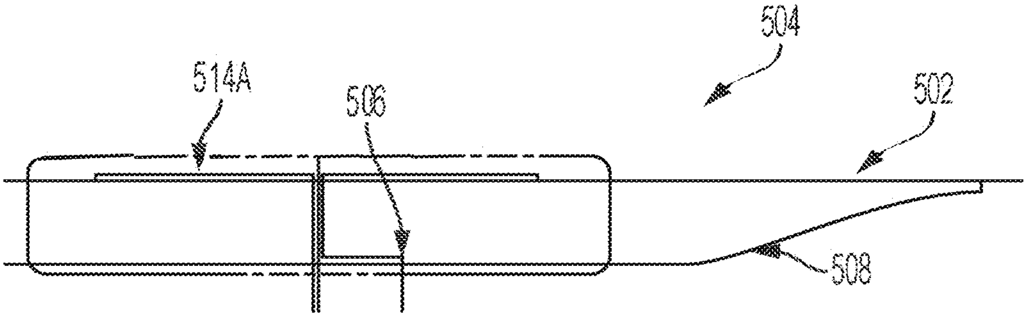
FIG. 5B is an example portion of a longitudinal support stiffener coupled to an interior of an inner tank at a trunnion mount location according to some embodiments of the disclosure.

In some embodiments, two or more of the trunnion mounts may include internal longitudinal support stiffeners to reinforce the inner tank at the trunnion attachment areas and reduce torsional forces in the inner tank. An example segment 500 of an inner tank is shown in FIG. 5A. For example, FIG. 5A may be a top-down view of a cross section of an inner tank of a cryogenic dewar showing a first trunnion mounting location 514A and a second trunnion mounting location 514B. A first trunnion mounting location 514A may include an internal longitudinal support stiffener 506 attached to an interior surface of the inner tank 502 at the mounting location 514A. The internal longitudinal support stiffener is shown by lines 506 and 512 in FIG. 5 that together indicate the structure of the stiffener. The stiffener may, for example, include one or more L-shaped aluminum bars and may couple the interior of the inner tank 502 at the first trunnion mounting location 514A to the interior of the inner tank 502 at the second trunnion mounting location 514B. For example, the stiffener 506, 512 may couple an interior of the inner tank 502 at a trunnion mounted on a curb side of the dewar to an interior of the inner tank 502 at a trunnion mounted on a road side of the dewar. Thus, the support stiffener 506, 512 may span the width of an interior of the internal tank 502 and may further support the structure of the inner tank 502. The stiffener 506, 512 may be located at the front and rear of the inner tank 502 in line with the location of the support stiffeners 506, 512. In some embodiments, support stiffeners may similarly be included between trunnion mounting locations at a bottom and a top of the inner tank 502. Such support stiffeners may be included between curb side and road side trunnion mounting locations and/or between top and bottom trunnion mounting locations at both front of the inner tank and a rear of the inner tank. As shown in the enlarged view 504 of FIG. 5B, an additional lateral reinforcement element 508 may couple the longitudinal support stiffener 506 to a further area of the inner tank, such as an area of the inner tank 502 outside of a trunnion mounting location 514A, providing additional support. In some embodiments, a support doubler may be located at an exterior of the inner tank at the trunnion mounting locations 514A-B.

Figure 6A:
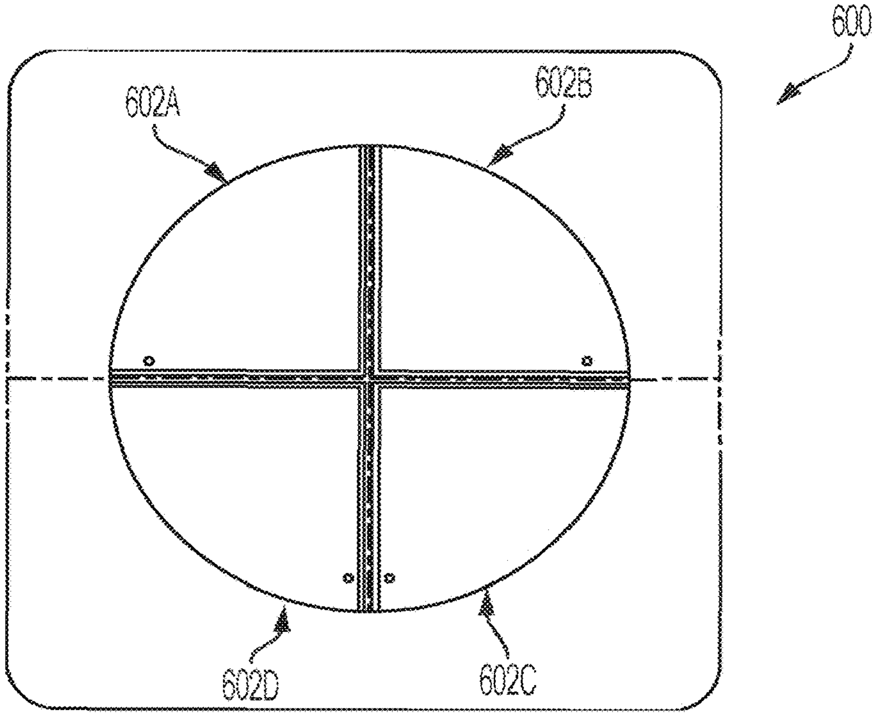
FIG. 6A is an example arrangement of pie-shaped reinforcing pads for a trunnion mount according to some embodiments of the disclosure.
Figure 6B:
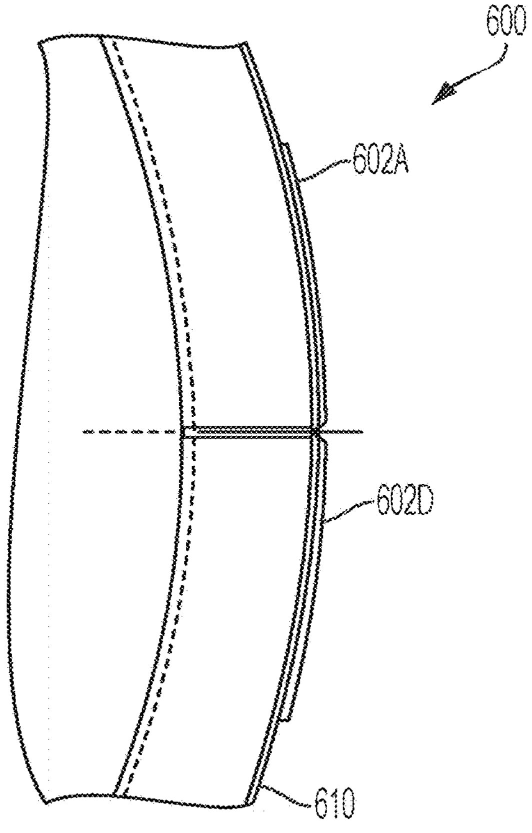
FIG. 6B is an example side view of an arrangement of pie-shaped reinforcing pads for a trunnion mount according to some embodiments of the disclosure.

In some embodiments, pie-shaped reinforcing pads may be used to strengthen a connection of a trunnion mount to an exterior surface of an inner tank of a cryogenic dewar. For example, as shown in trunnion mounting location 600 of FIG. 6A, four quarter-circle pie-shaped reinforcing pads 602A-D may be used to reinforce a connection of a trunnion mount to an outer surface of an inner tank as well as to strengthen an integrity of a structure of the inner tank and a connection of a trunnion mount to the inner tank. Each pie-shaped piece 602A-D may be welded to an outer surface of the inner tank. Furthermore, each pie-shaped piece may be welded to one or more of the other pie-shaped pieces. The welding area provided in the use of multiple pie-shaped pieces may further strengthen a connection of the trunnion mount between the inner tank and the outer tank, as the welding area between the pie shaped pieces may provide additional welding area over use of a single circular reinforcing pad. Additional welding area may strengthen a connection of a trunnion mount to an inner tank of the cryogenic dewar. The pie-shaped pieces 602A-D may be shaped to fit an outer surface of the inner tank 610, as shown in FIG. 6B. The pie-shaped reinforcing pad pieces 602A-D may be installed at trunnion mount locations at the front and rear of the inner tank, at the top and bottom of the inner tank, and/or on the road and curb side of the inner tank. In some embodiments, the pie-shaped reinforcing pad pieces 602A-D may be made of aluminum. The trunnion mounts, along with the internal longitudinal support stiffeners and pie-shaped reinforcing pad pieces may enhance the ability of the cryogenic dewar to be more resilient in the face of complex radial and axial forces generated by movement of the inner tank within the outer tank during transportation of the cryogenic liquids. The trunnion, comprising for example an eight-inch outer diameter tube, may be centered over the pie shaped pieces of the reinforcing pad.

Figure 7:
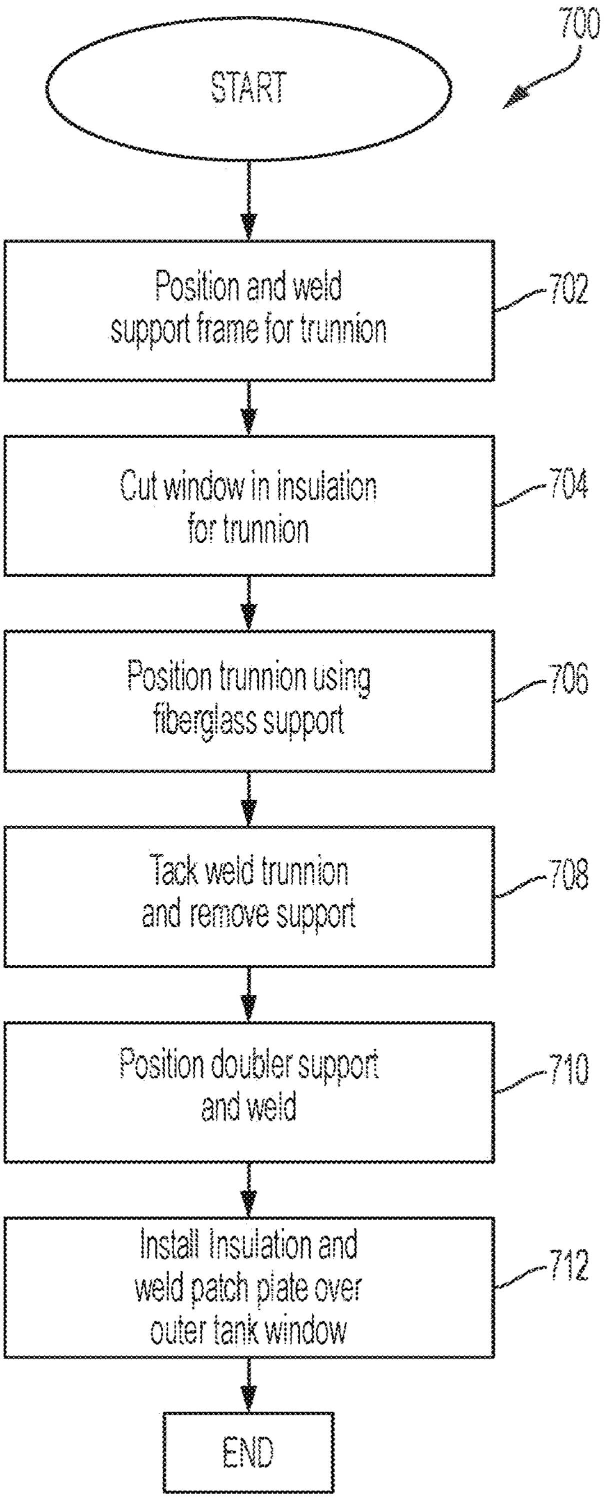
FIG. 7 is an example method for manufacturing a cryogenic dewar having multiple trunnion mounts between an inner tank and an outer tank according to some embodiments of the disclosure.

A method 700 for assembling a dewar having multiple trunnion mounts between an inner tank and an outer tank is shown in FIG. 7. The method 700 may begin, at step 702, with positioning and welding a support frame for a trunnion, such as after welding the reinforcing pads to the surface of the inner tank. For example, a support frame weldment for a trunnion may be placed within an opening cut in an outer tank for the trunnion mount and may be welded in place. For example, the support frame may be welded to an edge of the opening in the outer tank and/or to a surface of the inner tank or a reinforcing pad that has been welded to an outer surface of the inner tank.

At step 704, a window may be cut in insulation for the trunnion. For example, insulation may be placed over part or all of the opening in the outer tank and a window may be cut in the insulation for one or more components of the trunnion mount.

At step 706, fiberglass supports may be used to position the trunnion mount within the opening in the outer tank. For example, fiberglass supports of the support frame may be used to position one or more components of the trunnion, such as a segment of aluminum tubing. The fiberglass support may, for example, be centered in the frame using one or more stainless steel bars of the support frame. The trunnion mount may then be tack welded, at step 708, to the support frame, and part or all of the fiberglass support may be removed. The fiberglass support may be removed during operation of the trunnion mount, such that space 406 is empty. In some embodiments, stainless steel strips may also be installed between fiberglass supports and retainers during welding. Retainers may also be welded in place as part of a support frame. The dimensions of the trunnion mount, such as support interface dimensions, may be confirmed after welding.

At step 710, a doubler support may be positioned at the base of the trunnion mount, either at the surface of the inner tank or at the plurality of pie-shaped reinforcing pads welded to the external surface of the inner tank. At step 710, the doubler support, and, in some embodiments, other components of the trunnion such as the segment of aluminum tubing, may be welded to each other and/or to the inner tank.

At step 712, insulation may be installed within the trunnion and/or at an outer surface of the trunnion mount. A patch plate may be welded to an outer surface of the outer tank over the trunnion mount opening to cover the trunnion mount opening. For example, the patch plate may be centered over the trunnion mount cutout in the outer tank. The insulation and fiberglass supports may provide insulation to the cryogenic fluids in the inner tank, inhibiting warming of the inner tank by transfer of heat from the cryogenic fluid to the external environment through the trunnion mounts.

The schematic flow chart diagram of FIG. 7 is generally set forth as a logical flow chart diagram. Likewise, other operations for the circuitry are described without flow charts herein as sequences of ordered steps. The depicted order, labeled steps, and described operations are indicative of aspects of methods of the invention. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A cryogenic dewar comprising:

an inner tank;

an outer tank; and a plurality of trunnion mounts, wherein front trunnion mounts of the plurality of trunnion mounts are coupled between a front half of the inner tank and a front half of the outer tank, and wherein rear trunnion mounts of the plurality of trunnion mounts are coupled between a rear half of the inner tank and a rear half of the outer tank;

a first trunnion mount of the plurality of trunnion mounts comprising a plurality of pie-shaped reinforcing pads welded to each other and to an outer surface of the inner tank by a plurality of welds to reinforce a connection of the first trunnion mount to the outer surface of the inner tank, the pads spaced from each other to provide a welding area therebetween, the plurality of welds being received in the welding area to strengthen the connection of the first trunnion mount to the inner tank.

2. The dewar of claim 1 further comprising a doubler support at a base of the first trunnion mount on the pads and peripheral to the first trunnion mount to support the first trunnion mount.

3. A cryogenic dewar comprising:

an inner tank;

an outer tank; and a plurality of trunnion mounts, wherein front trunnion mounts of the plurality of trunnion mounts are coupled between a front half of the inner tank and a front half of the outer tank, and wherein rear trunnion mounts of the plurality of trunnion mounts are coupled between a rear half of the inner tank and a rear half of the outer tank;

a support stiffener coupled between a first portion of an inner surface of the inner tank at a first trunnion mount of the front trunnion mounts and a second portion of the inner surface of the inner tank at a second trunnion mount of the front trunnion mounts;

a reinforcement element connected directly to the support stiffener and extending away from the first trunnion mount to a further area of the inner surface of the inner tank outside of the first portion of the inner surface; and wherein the first trunnion mount comprises a plurality of pie-shaped reinforcing pads welded to each other and to an outer surface of the inner tank to reinforce a connection of the first trunnion mount to the outer surface of the inner tank.

4. The cryogenic dewar of claim 3, wherein a top trunnion mount of the front trunnion mounts and a top trunnion mount of the rear trunnion mounts are mounted between a top of the inner tank and a top of the outer tank, wherein a bottom trunnion mount of the front trunnion mounts and a bottom trunnion mount of the rear trunnion mounts are mounted between a base of the inner tank and a base of the outer tank, wherein a road side trunnion mount of the front trunnion mounts and a road side trunnion mount of the rear trunnion mounts are mounted between a road side of the inner tank and a road side of the outer tank, and wherein a curb side trunnion mount of the front trunnion mounts and a curb side trunnion mount of the rear trunnion mounts are mounted between a curb side of the inner tank and a curb side of the outer tank.

5. The cryogenic dewar of claim 3, wherein the first trunnion mount is located on a road side of the cryogenic dewar and the second trunnion mount is located on a curb side of the cryogenic dewar.

6. The cryogenic dewar of claim 3, wherein one or more of the trunnion mounts comprise eight inch outside diameter aluminum tubing.

7. The cryogenic dewar of claim 6, wherein the eight inch outside diameter aluminum tubing extends through at least a portion of a wall of the outer tank.

8. The cryogenic dewar of claim 3, wherein a length of a trailer upon which the cryogenic dewar is mounted is less than thirty-five feet.

9. The cryogenic dewar of claim 8, wherein the trailer further comprises a hydraulic cryogenic off-loading system.

10. The cryogenic dewar of claim 3, further comprising one or more patch plates coupled to the outer surface of the outer tank adjacent to each of the plurality of trunnion mounts.

11. The cryogenic dewar of claim 3, wherein the pads are spaced from each other to provide a welding area therebetween to strengthen the connection of the first trunnion mount to the inner tank.

12. The cryogenic dewar of claim 11, further comprising a doubler support at a base of the first trunnion mount on the pads and peripheral to the first trunnion mount to support the first trunnion mount.

13. The cryogenic dewar of claim 3 wherein the support stiffener comprises an L-shaped aluminum member.

* * * * *